United States Patent [19]

Perry et al.

[11] Patent Number: 5,070,489
[45] Date of Patent: Dec. 3, 1991

[54] DRIVING CIRCUIT FOR DOUBLE SOLENOID FOCUS ACTUATOR

[75] Inventors: Stuart D. Perry; Jasper S. Chandler, both of Rochester, N.Y.

[73] Assignee: Eastman Kodak Company, Rochester, N.Y.

[21] Appl. No.: 387,733

[22] Filed: Aug. 1, 1989

[51] Int. Cl.[5] .................................. G11B 7/00
[52] U.S. Cl. .............................. 369/44.16; 369/44.15; 369/32; 250/201.5; 359/824
[58] Field of Search ................. 369/44.15, 44.16, 44.22, 369/44.29, 44.36, 106, 44.25, 32; 350/255, 247, 245; 310/90.5, 14, 191, 46; 250/201.5

[56] References Cited

U.S. PATENT DOCUMENTS

| | | | |
|---|---|---|---|
| 4,541,084 | 9/1985 | Oku et al. | 369/44.15 |
| 4,561,081 | 12/1985 | Janssen et al. | 369/44.17 |
| 4,660,190 | 4/1987 | Fujii et al. | 369/44.16 |
| 4,733,066 | 3/1988 | Konno et al. | 369/44.25 |
| 4,748,610 | 5/1988 | Nakata et al. | 369/44.25 |

Primary Examiner—Roy N. Envall, Jr.
Assistant Examiner—Thang V. Tran
Attorney, Agent, or Firm—Warren W. Kurz

[57] ABSTRACT

A circuit for driving a focus actuator of the "double-solenoid" (i.e. twin-coil) variety comprises circuit means for selectively supplying current to one or the other of the actuator's coils in such a manner as to eliminate any dead-band discontinuity in the actuator response while current-switching between the coils. Such circuitry comprises a current source and/or amplifier for selectively providing current to the actuator coils, means for detecting the difference in current flowing in the coils, an a differential amplifier, connected in a feedback loop, for comparing the output of the detecting means with a signal indicating the focal position of a focusing lens. The output of the differential amplifier is used to control the output of the current source, controlling which of the two actuator coils receives current and how much.

4 Claims, 4 Drawing Sheets

DRIVING CIRCUIT FOR DOUBLE SOLENOID FOCUS ACTUATOR

BACKGROUND OF THE INVENTION

This invention relates to improvements in circuits for driving focus actuators of the "double solenoid" variety. Such actuators are useful, for example, in the fields of optical recording and playback for maintaining a read/write laser beam in sharp focus on a moving optical recording element.

In the commonly assigned U.S. application Ser. No. 263,441 filed on Oct. 27, 1988 in the name of J. S. Chandler and entitled "Double Solenoid Focus Actuator For Optical Recording/Playback Apparatus," there is disclosed a focus actuator for controlling the focal position of a lens used in an optical recording system to focus a laser beam on a recording element. Such actuator comprises a pair of juxtaposed coils which concentrically surround a ferromagnetic lens barrel which supports the focusing lens. When current is applied to one coil or the other, the lens barrel moves along the lens axis in an attempt to minimize the magnetic path between the energized coil and the lens barrel. In effect, the actuator behaves as a pair of solenoids mounted back-to-back with the lens barrel serving as a shared core piece or plunger. An advantage of this particular type of focus actuator over similar devices is that it requires no permanent magnet.

In the above-noted application, a simple circuit is disclosed for energizing one or the other of the actuator coils. Such circuit comprises a diode arrangement which, when connected to a signal of alternating polarity, allows current to flow in either one of the coils, depending on the signal polarity. While this driving circuit operates well with input signals of relatively large amplitude, it cannot respond to input signals of relatively low amplitude, as is required to maintain a "fine" focus condition. The problem with such diode circuits is that the turn on voltage of each diode is typically about 0.7 volts. Thus, since the circuit will not respond to voltages of lesser value, there is a dead-band discontinuity in the system until the control signal exceeds about 0.7 volts. Ideally, the focus actuator should respond to the smallest of signals in order to position the focusing lens with the precision required for high density optical recording.

In addition to the dead-band discontinuity problem mentioned above, another characteristic of the double solenoid focus actuator is that its response is non-linear; in fact, its response is substantially quadratic, the lens displacement varying with the square of the applied coil current. Such a response can render the focus servo system unstable for low-amplitude focus servo signals.

SUMMARY OR THE INVENTION

In view of the foregoing, an object of this invention is to provide a driving circuit for a double-solenoid-type focus actuator which is substantially free of the aforementioned dead-band discontinuity and which, if desired, can be operated in a bias condition to render the actuator response more linear.

The driving circuit of the invention basically comprises a high-gain differential amplifier having one of its two inputs connected to a time-varying signal representing the focus condition of a laser beam, and a current source (and/or amplifier) connected to the output of the differential amplifier. The current source is adapted to provide current to either of the actuator coils, depending upon the amplitude and polarity of the differential amplifier output. Means are provided for continuously detecting the difference in current flowing in the two actuator coils and for producing a time-varying signal proportional to such current difference, such signal serving as the second input to the differential amplifier. Preferably, the current source is biased to provide both actuator coils with a constant amplitude current superimposed on a time-varying current representing the differential amplifier output.

The operation and details of the driving circuit of the invention will be better understood from the ensuing detailed description of preferred embodiments, reference being made to the accompanying drawings.

DETAILED DESCRIPTION OF PREFERRED EMBODIMENTS

Figure 1:
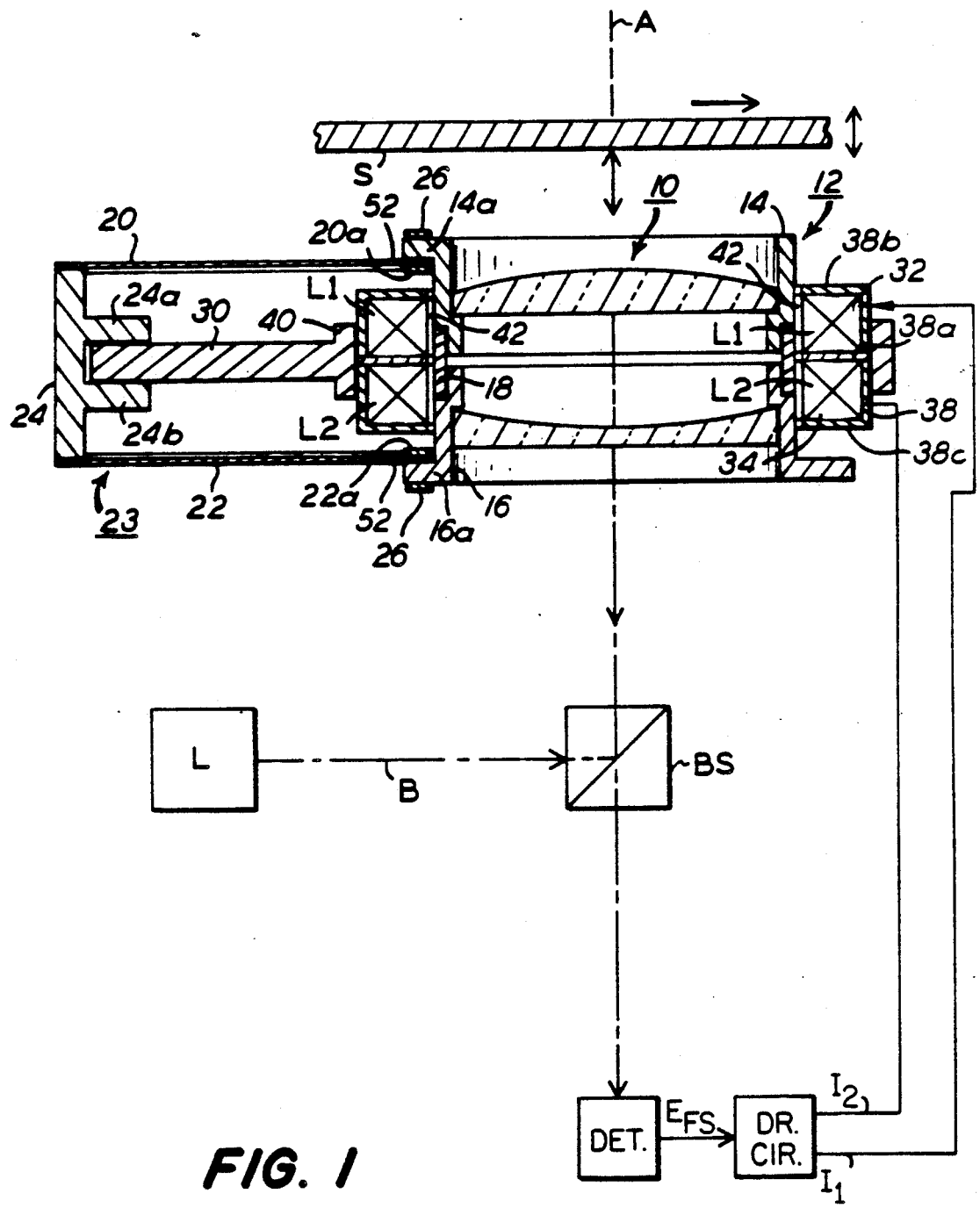
FIG. 1 is a cross-sectional schematic illustration of a portion of an optical recording system in which the driving circuit of the invention finds utility.

FIG. 1 is a schematic illustration of an optical recording system embodying a focus actuator of the type described in the aforementioned Chandler application. Such system comprises a laser L for producing a beam of radiation B which is deflected by a beam splitter BS toward the moving surface S of an optical or magneto-optical recording element. Surface S moves both perpendicular and parallel to beam B, as denoted by the arrows. The laser beam is focused on surface S by an objective lens 10 which is supported in a cylindrical lens barrel 12 defined by a pair of concentric tubular members 14 and 16. Each of the tubular members has an internal reference surface for supporting an optical element, lens 10 being shown as a doublet comprising plano-convex and plano-concave elements. Tubular members 14 and 16 are connected by a cylindrically shaped member 18 which is made of a ferromagnetic material of low coercivity, preferably soft iron. The material of member 18 is capable of readily conducting magnetic flux when subjected to a magnetic field without becoming permanently magnetized when removed from such field.

Lens housing 12 and its associated ferromagnetic cylinder 18 are supported for movement along the lens axis A by a pair of flat springs 20, 22. Springs 20 and 22 may be formed from a single sheet of spring stock 23 which is wrapped around and bonded to a support member 24. The free ends 20a and 22a of the flat springs are affixed to flanges 14a and 16a, respectively, of the tubular lens-supporting members 14 and 16. In addition to being adhesively bonded to such flanges, the free ends of the flat springs are held in place by a pair of metal bands 26 which are wrapped around each of the flanges 14a and 16a.

Spring support member 24 is affixed to one end of the actuator's mounting plate 30 by a pair of rigid tabs 24a and 24b which extend outwardly from the central region of member 24 and define a slot for receiving mounting plate 30 in an interference fit. Plate 30 is provided with a pair of apertures 30a for attachment, for example, to the stationary frame of an optical write/-read head. In addition to supporting the spring support member 24, mounting plate 30 also supports a pair of electro-magnetic elements 32, 34 which may take the form of inductance coils L1 and L2, respectively. Coils L1 and L2 are housed by a ferromagnetic shroud 38 (e.g. soft iron) comprising a coil-separating portion 38a, and top and bottom portions 38b and 38c, respectively. Shroud 38 and its contained coils L1 and L2 are supported in a collar 40 which defines a circular aperture in mounting plate 30. As shown in FIG. 1, coils L1 and L2 are concentrically arranged with respect to the ferromagnetic cylinder 18, as well as with respect to optical axis A. A small air gap 42 is provided between the coils and ferromagnetic cyclinder 18 to allow the lens assembly to move axially, parallel to the lens axis A.

In operation, radiation reflected from surface S passes through beam splitter BS to detector DET. The detector is of conventional design and serves to produce a time-varying focus error signal $E_{FS}$ which varies both in amplitude and polarity. This focus error signal serves as the input to a driving circuit DR. CIR. (described below). The driving circuit functions to alternately energize coils L1 and L2 by alternately applying current, $I_1$ or $I_2$, respectively, to the coils. Coil L1 responds to current signal $I_1$ to produce a magnetic field tending to advance the ferromagnetic cylinder 18 in an upward direction, thereby moving lens 10 toward surface S. Cylinder 18 moves upwardly to a position in which it provides the shortest magnetic path between the pole tips defined by the free end of the shroud top plate 18b and the free end of the separator portion 18a. Similarly, coil L2, in response to current signal $I_2$, produces a magnetic field tending to advance the ferromagnetic cylinder 18 downwardly, thereby moving lens 10 away from surface S. The soft iron shroud 38 also serves to confine the magnetic path between the coils and cylinder 18, thereby reducing stray flux. It should be noted that the operation of the FIG. 1 actuator is totally independent of the direction of coil windings or the polarity of $I_1$ and $I_2$.

Figure 2:
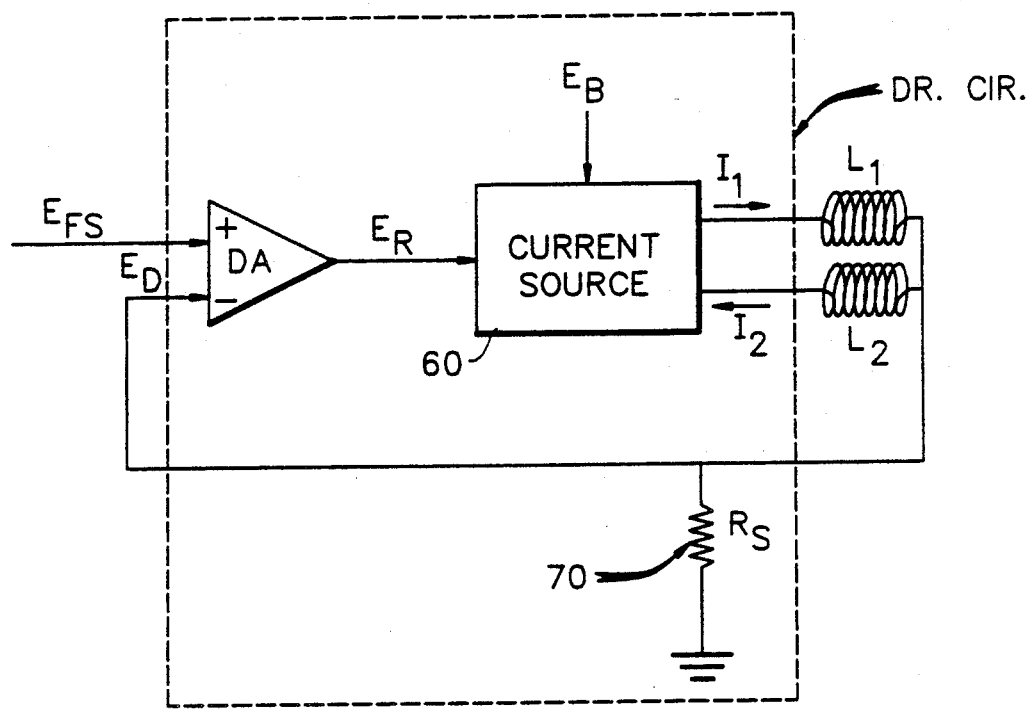
FIG. 2 is an electrical schematic of the focus actuator driver circuit of the invention.
Figure 3:
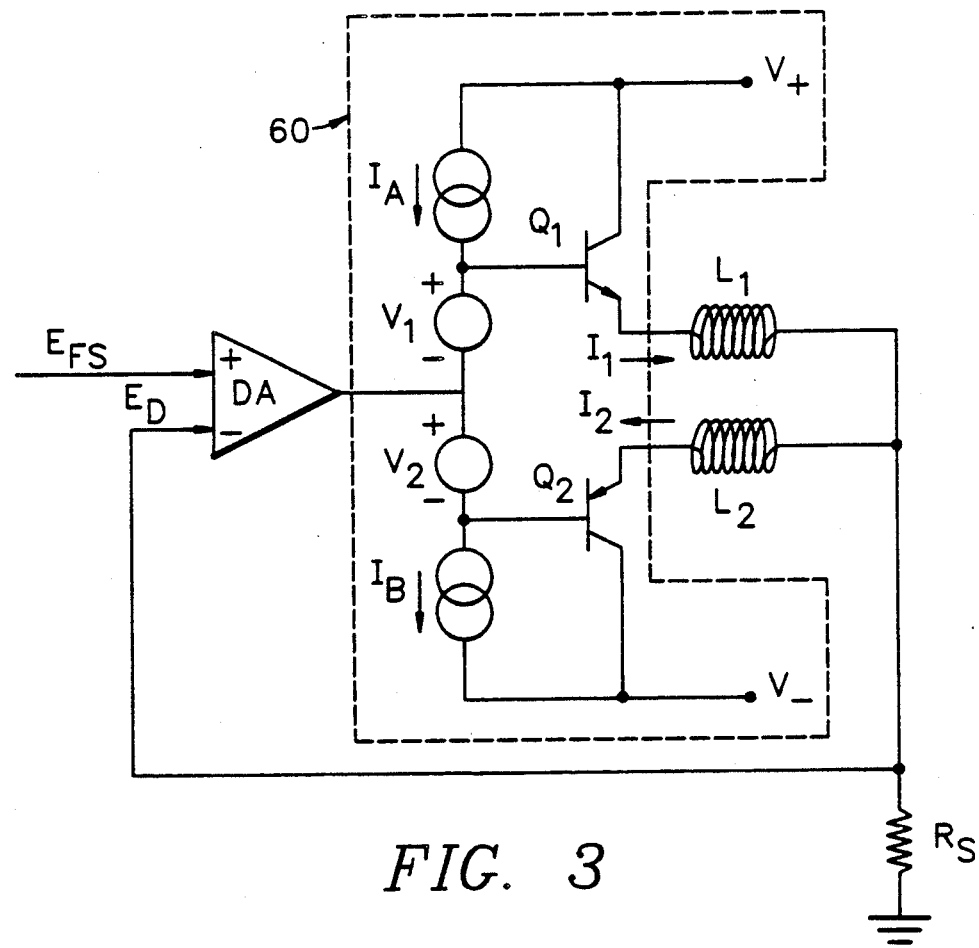
FIG. 3 is an electrical schematic of a preferred driver circuit.

Now, in accordance with the present invention, the actuator driving circuit, shown in the electrical schematics of FIGS. 2 and 3, basically comprises the combination of a current source 60 for selectively applying current to coils L1 and L2, circuit means 70, including sampling resistor $R_S$, for detecting the difference in current flowing in coils L1 and L2 and for producing a difference $E_D$ signal representative thereof, and a differential operational amplifier DA for continuously comparing such difference signal with the focus error signal $E_{FS}$ provided by the focus detector. As explained below, the current source is responsive to the differential amplifier output $E_R$ to control the current flow through the coils so that, during current switching form one coil to the other, ther is no dead-band discontinuity in the actuator response whenever the focus error signal $E_{FS}$ is at a low level. As noted above, this dead-band discontinuity is characteristic of the prior art driving circuits. Preferred details of the current source as shown in FIG. 3.

Referring to FIG. 3, current source 60 comprises a pair of discrete current sources $I_A$ and $I_B$, a pair of voltage sources $V_1$ and $V_2$, and transistors $Q_1$ and $Q_2$. They function together, these elements functions in the following manner. Current sources $I_A$ and $I_B$ serve to provide transistors $Q_1$ and $Q_2$ with the base current required for proper operation. Voltages sources $V_1$ and $V_2$ serve to turn on transistors $Q_1$ and $Q_2$ thereby inducing current flow $I_1$ and $I_2$. Note, that an increase in $V_1$ and $V_2$ results in an increase in $I_1$ and $I_2$ and produces the desired effect of providing bias current to coils $L_1$ and $L_2$. Note, that if the transistors have identical properties (notably, the same current gain and diode drop voltages) no change in $(I_1-I_2)$ results from an identical increase in $V_1$ and $V_2$; hence, no positional change is seen in the actuator.

Figure 4A:
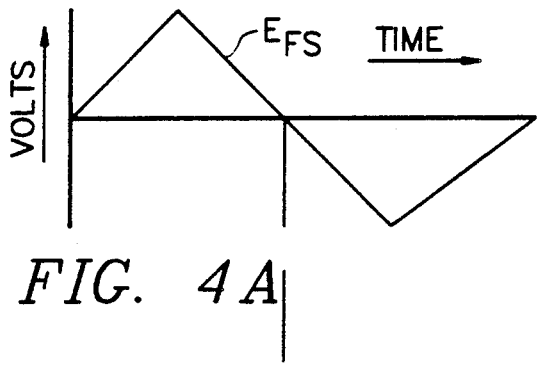
FIGS. 4A-4D are waveforms illustrating the output of the prior art circuits.
Figure 5A:
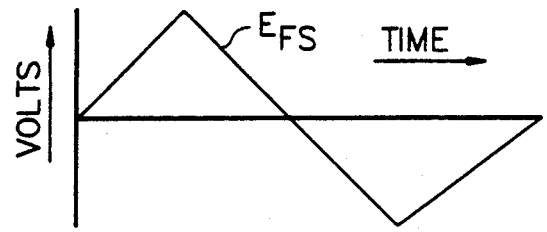
FIGS. 5A-5D are waveforms illustrating the output of the driving circuit of the invention.
Figure 4B:
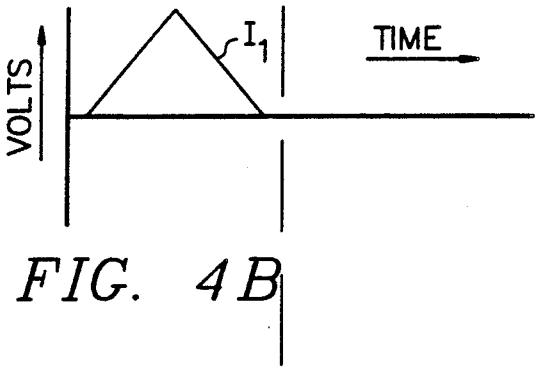
Figure 5B:
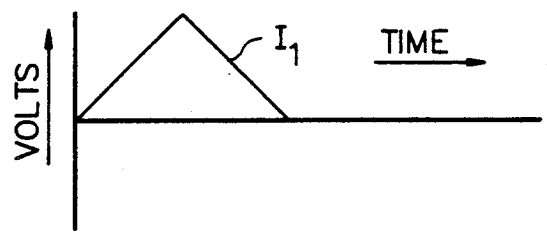
Figure 4C:
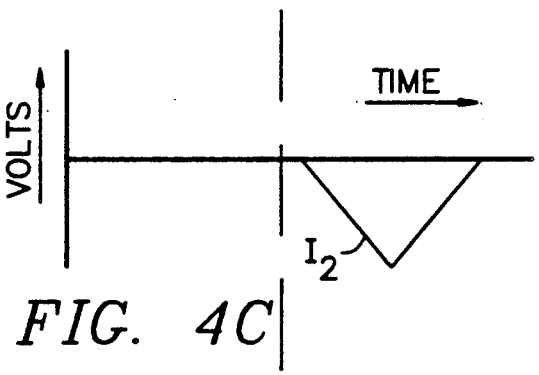
Figure 5C:
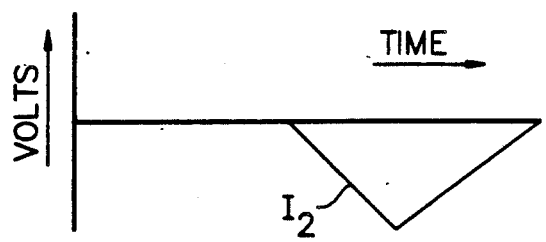
Figure 4D:
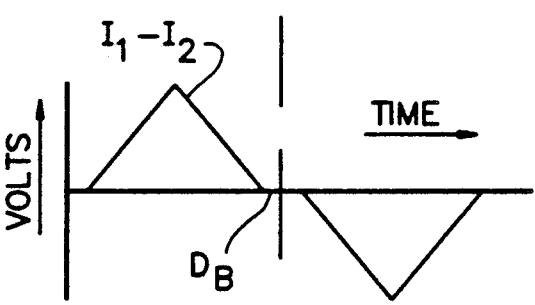
Figure 5D:
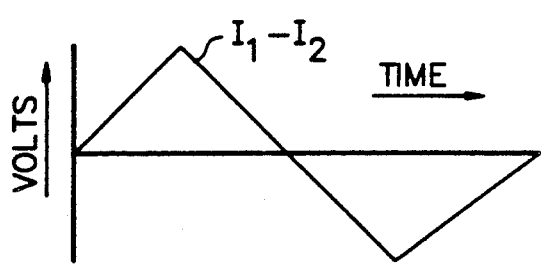

The advantageous technical effect of this invention can better be appreciated by comparing the waveforms of FIGS. 4A–4D with those FIGS. 5A–5D. In FIG. 4A, the focus error signal is shown, for the sake of illustration, as having a triangular waveform of alternating polarity. Until the voltage exceeds the turn-on voltage of the prior art's diode network, which serves to prevent current flow in one coil while allowing it in the other, the currents $I_1$ and $I_2$ applied to the actuator coils will be zero, and the currents $I_1$ and $I_2$ applied to the coils will have the waveform shown in FIGS. 4B and 4C. The difference in coil currents $I_1-I_2$, which represents the actuator response, is illustrated in FIG. 4D. Notice the dead-band discontinuity $D_B$ occurring during the period of a low-amplitude focus error signal. During this dead-band, the lens is not moving in order to correct for small focus errors.

In contrast, the driving circuit of the invention gives rise to the electrical waveforms shown in FIGS. 5A–5D. Notice that the coil currents $I_1$ and $I_2$ precisely follow the waveform of the focus error signal, thereby eliminating any substantial dead-band discontinuity.

Figure 6A:
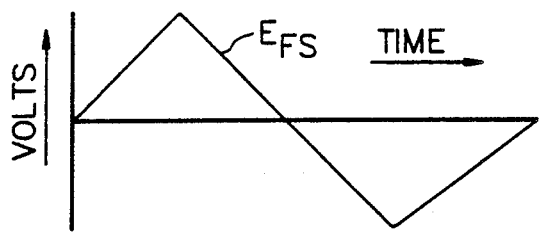
FIGS. 6A-6D are waveforms illustrating a focus actuator response with bias applied.
Figure 6B:
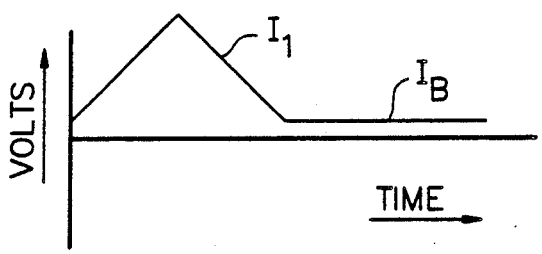
Figure 6C:
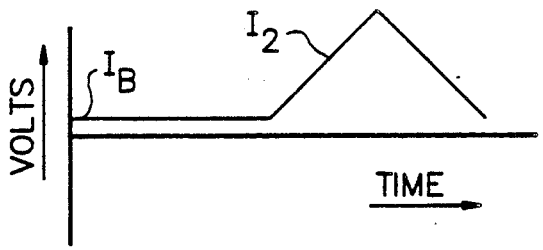
Figure 6D:
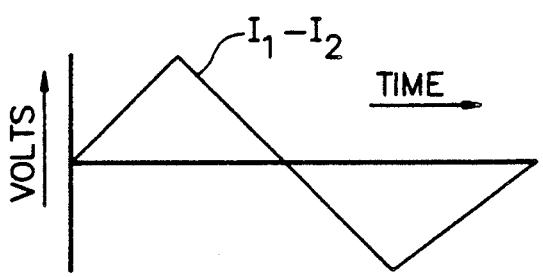
Figure 7A:
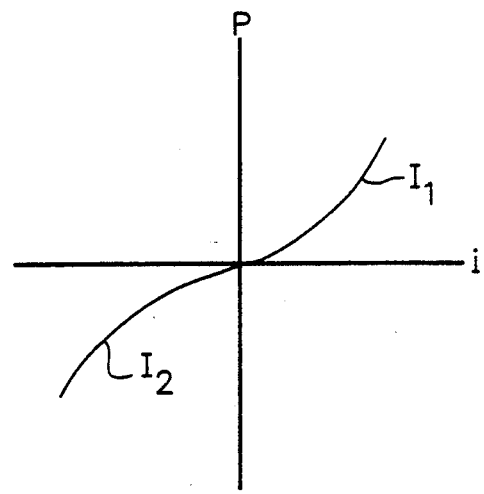
FIG. 7, consisting of A and B, compares the respective responses of a focus actuator driven by biased and unbiased driver circuits.
Figure 7B:
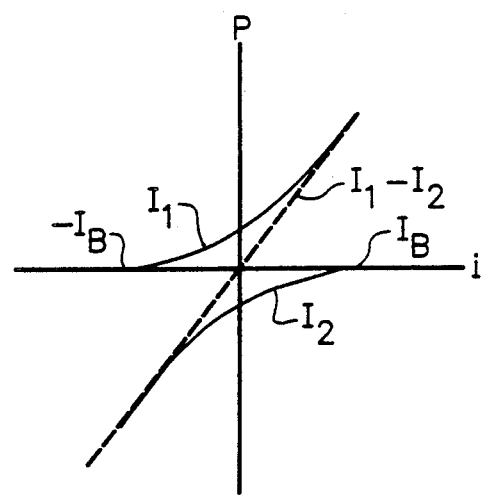

As noted above, it has been observed that the lens position (P) versus applied (i) response of a double-solenoid actuator is substantially quadratic, rather than linear, as would normally be desired. FIG. 7A illustrates such a response as currents $I_1$ and $I_2$ are applied to the actuator coils L1 and L2. At the applied current approaches zero it will be seen that the systems gain as defined by the slope of the curve, approaches zero. This gives rise to an unstable servo system and, obviously, one to be avoided. To avoid this situation, it has been found that, by biasing each of the coils with a bias current $I_B$ (as shown in FIGS. 6B and 6C) the system response $I_1-I_2$ can be rendered substantially linear about the zero position. FIG. 7B illustrates the biased condition in which each coil is receiving a bias current $I_B$ when the lens position is in its nominal (zero) position. As one coil receives more current, the current through the other coil is gradually reduced. The resultant system response $(I_1-I_2)$ is that shown in the dashed line of FIG. 7B. As is apparent, the current bias in each coil has the advantageous effect of linearizing the system response. This effect, however, is achieved by slightly increasing the power requirements of the driving circuit.

The invention has been described in detail with particular reference to preferred embodiments thereof, but it will be understood that variations and modifications can be effected within the spirit and scope of the invention.

What is claimed is:

1. A driving circuit for controlling the operation of an electromagnetic focus actuator, such actuator being adapted to control the focal position of a lens in response to a time-varying focus error signal indicating the instantaneous spacing between the lens and a desired focal plane, wherein said time-varying focus error signal is provided by a detector responsive to a difference between radiation focused on the desired focal plane and radiation currently impinging on the desired focal plane, such actuator comprising (i) a magnetizable member rigidly coupled to such lens, (ii) means for supporting such member and lens for movement along the lens axis, and (iii) a pair of electromagnetic coils surrounding the magnetizable member, such coils being adapted to produce, in response to current flowing therethrough, a time-varying magnetic field through the magnetizable member, such magnetic field being effective to control the movement of the magnetizable member and its associated lens along the lens axis, said driving circuit comprising:
   a) a high-gain differential amplifier having first and second inputs and an output representing the difference between said inputs, one of said inputs being connected to said time-varying focus error signal;
   b) a variable current source connected to the output of said differential amplifier, said current source being responsive to a polarity and amplitude of said amplifier output to control the current in either or both of said coils; and
   c) circuit means for continuously detecting a difference in current flowing in said coils and for providing a time-varying control signal proportional to such current difference, said control signal being connected to said second input of said differential amplifier.

2. The apparatus as defined by claim 1 wherein said current source is biased to provide both of said coils with a constant amplitude current superimposed on a time-varying current representing the differential amplifier output.

3. A driving circuit for controlling the operation of an electromagnetic focus actuator, such actuator being adapted to control the focal position of a lens in response to a time-varying focus error signal indicating the instantaneous spacing between the lens and a desired focal plane, wherein said time-varying focus error signal is provided by a detector responsive to a difference between radiation focussed on the desired focal plane and radiation currently impinging on the desired optical plane, said detector determining an amplitude and a polarity of said time-varying focus error signal, such actuator comprising (i) a magnetizable member rigidly coupled to such lens, (ii) means for supporting such member and lens for movement along the lens axis, and (iii) a pair of electromagnetic coils surrounding the magnetizable member, such coils being adapted to produce, in response to current flowing therethrough, a time-varying magnetic field through the magnetizable member, such magnetic field being effective to control the movement of the magnetizable member and its associated lens along the lens axis, said driving circuit comprising:
   a) means for continuously detecting a difference in current flowing through the coils and for producing a difference signal having a polarity and amplitude representing such difference; and
   b) feedback control means for providing a control signal in response to the polarity and amplitude of said difference signal and in response to the polarity and amplitude of said focus error signal;
   c) a variable current source for selectively providing current to either or both of the coils, said current source being responsive to the polarity and amplitude of said control signal to control the current flow to one coil or the other.

4. The apparatus as defined by claim 3 wherein said feedback control means includes a differential amplifier having a pair of inputs and an output, said difference signal being applied to one of the differential amplifier inputs and said focus error signal being applied to the other of said inputs; the output of said differential amplifier indicating the difference between the input signals, said output serving as the control signal to said current source.

* * * * *